United States Patent
Sugie et al.

(10) Patent No.: US 8,532,813 B2
(45) Date of Patent: Sep. 10, 2013

(54) METHOD OF CONTROLLING THREAD CUTTING

(75) Inventors: Masayuki Sugie, Oguchi-cho (JP); Shigeki Ueno, Oguchi-cho (JP)

(73) Assignee: Okuma Corporation, Oguchi-cho (JP)

( * ) Notice: Subject to any disclaimer, the term of this patent is extended or adjusted under 35 U.S.C. 154(b) by 189 days.

(21) Appl. No.: 13/039,872

(22) Filed: Mar. 3, 2011

(65) Prior Publication Data
US 2011/0218666 A1   Sep. 8, 2011

(30) Foreign Application Priority Data
Mar. 5, 2010   (JP) ................................. 2010-049365

(51) Int. Cl.
*G06F 19/00* (2011.01)

(52) U.S. Cl.
USPC .......................................... 700/188; 700/160

(58) Field of Classification Search
USPC ................................................ 700/160, 188
See application file for complete search history.

(56) References Cited

FOREIGN PATENT DOCUMENTS
JP   2007-319971   12/2007

*Primary Examiner* — Carlos Ortiz Rodriguez
(74) *Attorney, Agent, or Firm* — Nelson Mullins Riley & Scarborough LLP; Anthony A. Laurentano (57) ABSTRACT

A method includes: (a) transferring a tool to where thread cutting is to start; (b) cutting threads in work with the tool; (c) performing tool deceleration along the Z-axis and acceleration along the X-axis during a predetermined acceleration/deceleration time Ta to retract the tool along the X-axis; and (d) returning the tool to a reference point. In Step (c), to shorten the incomplete thread portion, a command is issued concurrently with the start of the acceleration/deceleration time Ta to realize a pullout speed Ve along the X-axis that exceeds an allowable maximum speed Vmax to increase the acceleration along the X-axis. The speed command for moving the tool along the X-axis is maintained at the value of zero from the elapse of command time Te until the acceleration/deceleration time Ta expires to maintain the actual speed of the tool along the X-axis at or below the allowable maximum speed Vmax.

2 Claims, 7 Drawing Sheets

PRIOR ART

$$Ve = (\alpha 2 / \alpha 1) \times Vmax$$
$$Te = (\alpha 1 / \alpha 2) \times Ta$$

- Ve : command speed value Ve for pullout operation
- Te : command time for Ve
- $\alpha 1$ : allowable acceleration along Z-axis
- $\alpha 2$ : allowable acceleration along X-axis
- Vmax : allowable maximum speed along X-axis
- Ta : acceleration/deceleration time for X-axis and Z-axis

METHOD OF CONTROLLING THREAD CUTTING

BACKGROUND OF THE INVENTION

1. Field of the Invention

The present invention relates generally to a method of cutting threads in work by using a numerically controlled machine tool, and more particularly to a method of shortening the incomplete thread portion in threading pullout.

2. Description of the Related Art

Figure 1:
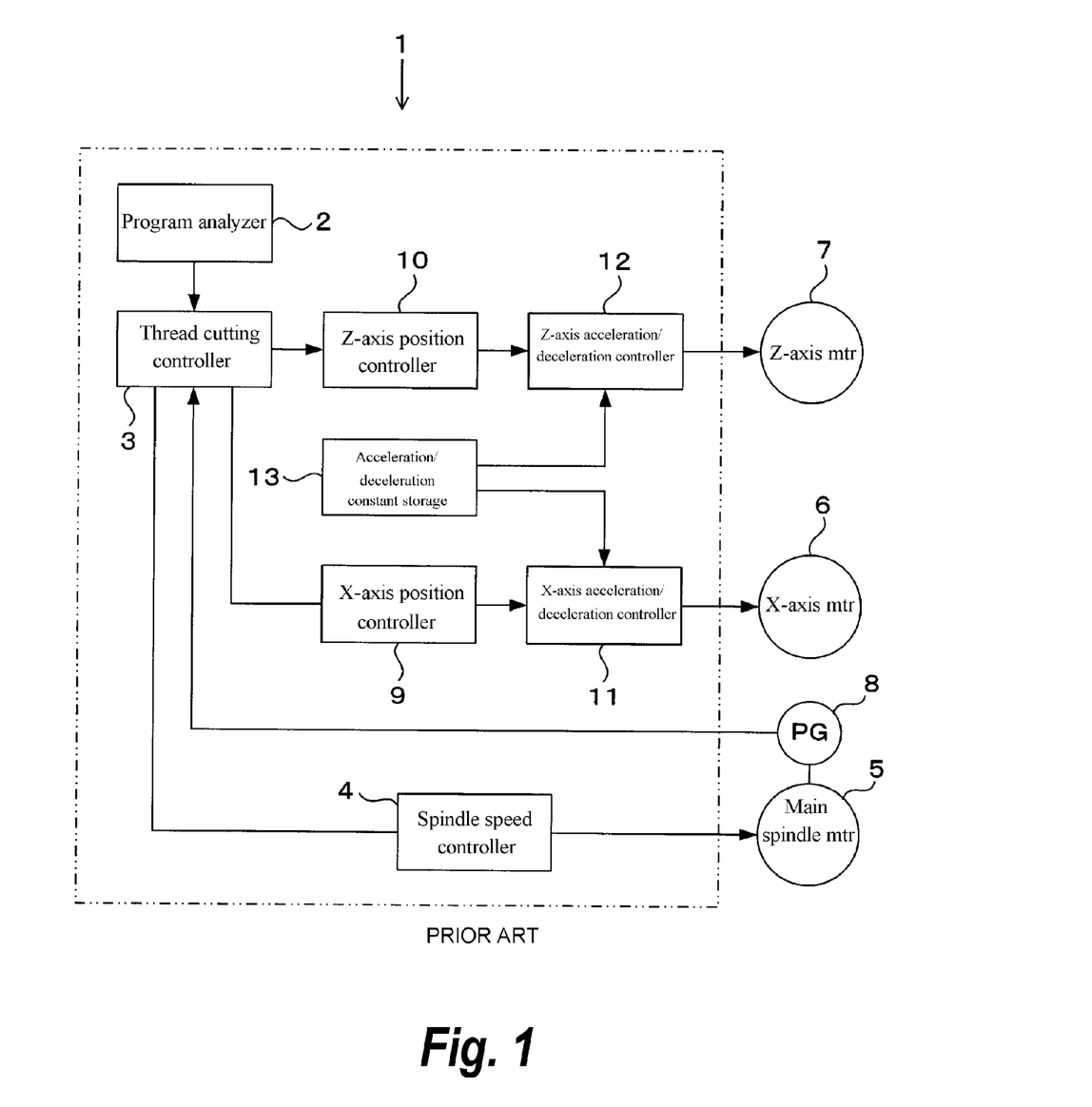
FIG. 1 is a block diagram of a numerical control apparatus for a machine tool.

A known method of cutting threads in work is illustrated in FIGS. 1-4. FIG. 1 shows a functional configuration diagram of a numerical control apparatus 1, such as a numerically controlled lathe ("NC lathe" hereafter) used for cutting threads in work. This numerical control apparatus 1 includes a program analyzer 2 and a thread cutting controller 3. The program analyzer 2 is responsible for analyzing a machining program and for outputting commands regarding the rotational speed of the main spindle to the spindle speed controller 4 so as to control the operation of the main spindle drive motor 5.

As the program analyzer 2 reads a thread-cutting command from the machining program, the thread cutting controller 3 controls the X-axis position controller 9 and the Z-axis position controller 10 based on the thread-cutting information contained in the thread-cutting command, such as the pitch and the cut-in amount, as well as the information regarding the rotational position of the main spindle received from the pulse generator (PG) 8 included with the main spindle drive motor 5.

The X-axis position controller 9 generates and sends a position command along the X-axis to the X-axis acceleration/deceleration controller 11 so as to cause the tool to cut the work to the commanded cut-in amount. The Z-axis position controller 10 generates position commands regarding the Z-axis as command values that vary with time in synchronization with the rotation of the main spindle and sends these commands to the Z-axis acceleration/deceleration controller 12 so that the tool may cut the work at the feed speed to provide the commanded pitch.

The X-axis and Z-axis acceleration/deceleration controllers 11 and 12 in turn use acceleration/deceleration constants read out from the acceleration/deceleration constant storage 13 to control the acceleration/deceleration of the X-axis drive motor 6 and the Z-axis drive motor 7. The acceleration/deceleration constants, which comprise information about the allowable acceleration in the direction of the Z-axis (the acceleration/deceleration capabilities of the machine tool in the direction of the Z-axis is lower than those in the direction of the X-axis), are pre-stored in the acceleration/deceleration constant storage 13 so as to provide biaxial synchronous feed. During the pullout in thread cutting, the allowable Z-axis acceleration is used for acceleration/deceleration time constant control in the directions of the X-axis and Z-axis (acceleration/deceleration by the method of moving averages).

Figure 2:
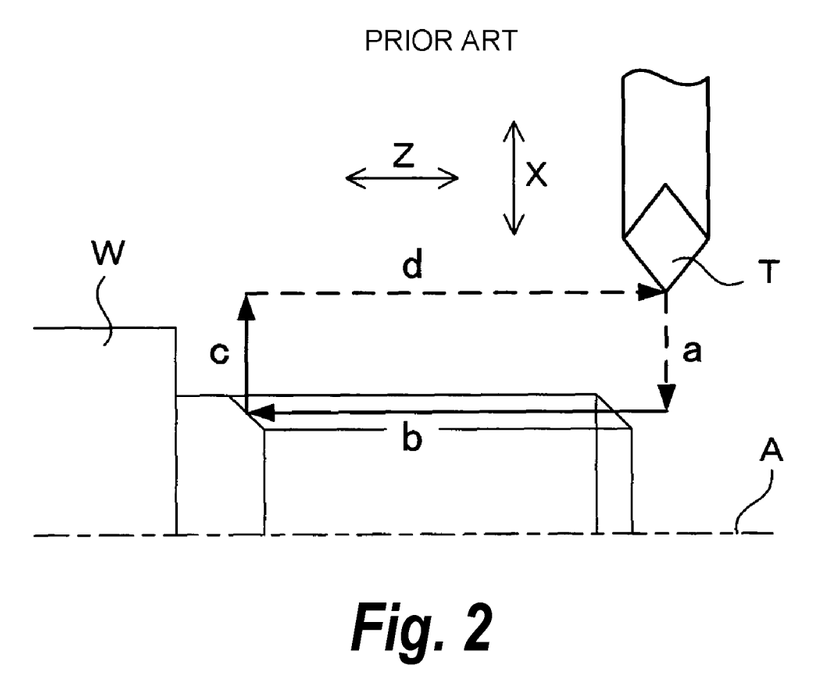
FIG. 2 is a schematic diagram showing a typical thread cutting cycle.
Figure 3:
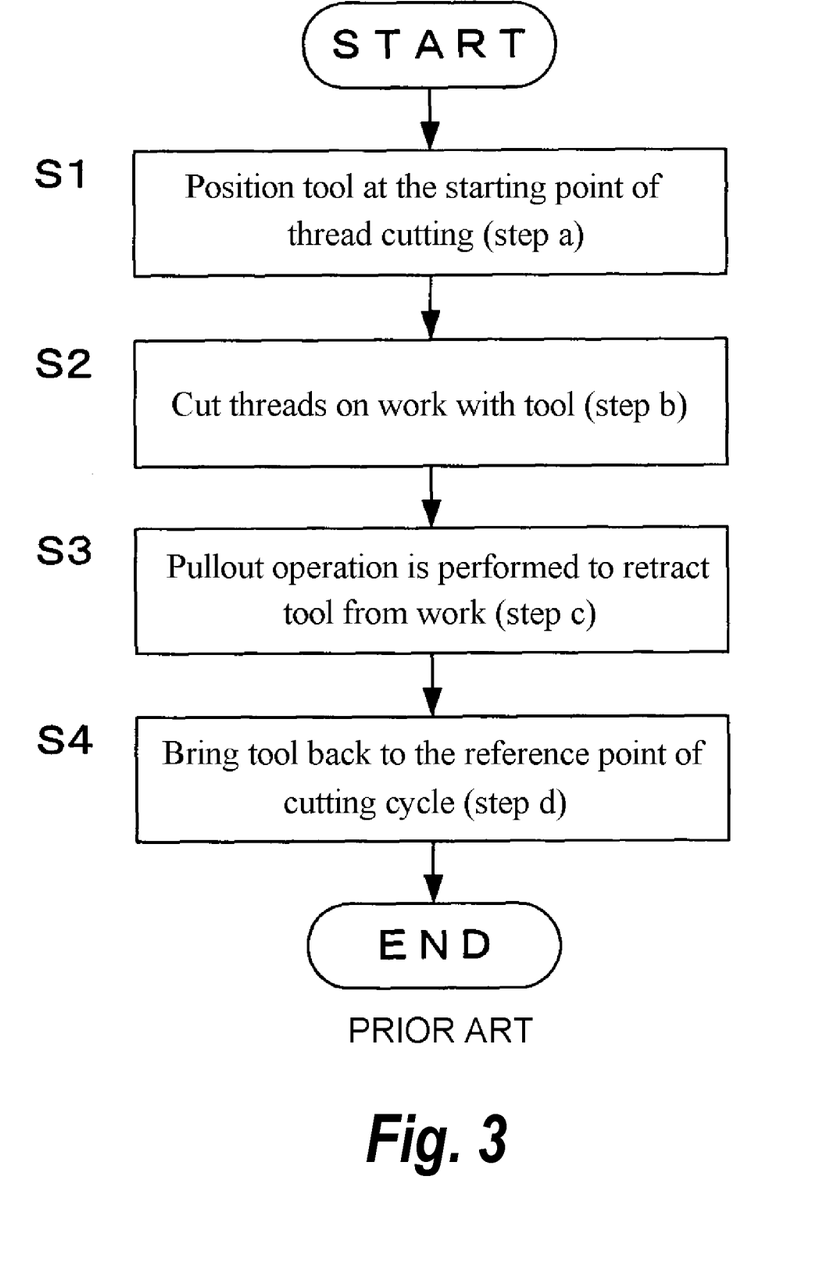
FIG. 3 is a flowchart showing a conventional method of cutting threads on work.

FIGS. 2 and 3 show a method of cutting threads in work under the control of the thread cutting controller 3. Generally, a typical thread cutting cycle includes the following four steps a-d. In step a, the tool T is transferred in the direction of the X-axis perpendicularly to the axis A of the main spindle to position the tool T at the point where thread cutting is to be started (S1 in FIG. 3). In step b, in synchronization with the rotation of the main spindle (not shown), the tool T is transferred at a predetermined feed speed in the direction of the Z-axis in parallel to the axis A of the main spindle to cut the work W held on the main spindle with the tool T (S2).

In step c, a "pullout" operation is performed; i.e., the tool T is retracted or moved away from the work W in the direction of the X-axis (S3). In step d, the tool T is withdrawn in the direction of the Z-axis to bring the tool back to the reference point of the thread cutting cycle (S4). If tapered threads are cut on the work W, biaxial synchronous feed in the direction of the X-axis and Z-axis is performed in step b.

Figure 4:
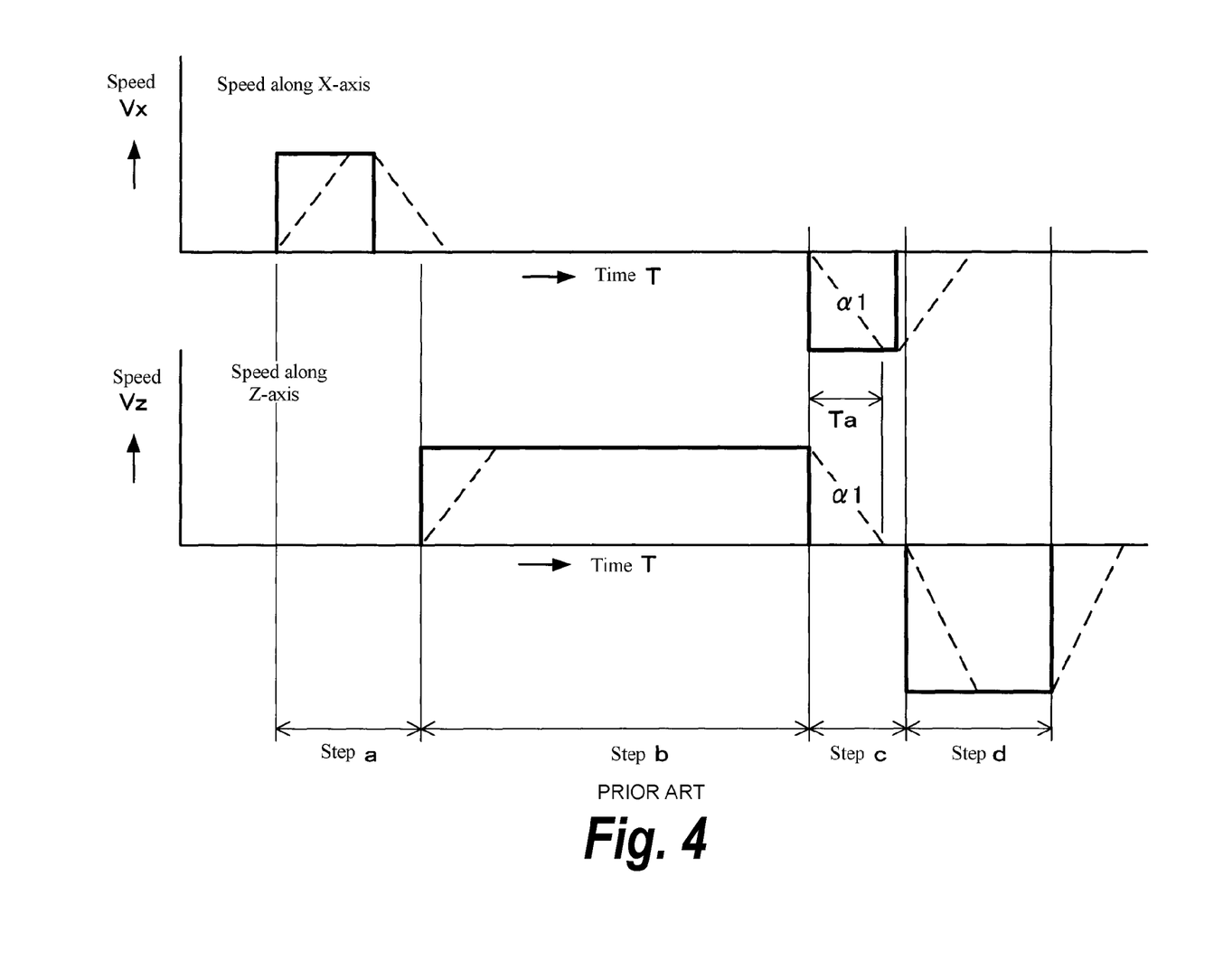
FIG. 4 is a timing diagram showing the changes in the speed in the directions of the X-axis and Z-axis according to the conventional method of FIG. 3.

FIG. 4 shows the changes in the speed of the tool_in the directions of the X-axis and Z-axis according to the conventional method of thread cutting. The solid lines represent the speed commands of the numerical control apparatus 1, whereas the broken lines represent the speeds of the tool interpolated according to acceleration/deceleration time constant control. Of the acceleration/deceleration capabilities of the machine tool in the direction of the X-axis and Z-axis, generally, the machine tool has higher acceleration/deceleration capabilities in the direction of the X-axis, along which a less mass (the tool post) needs to be driven than along the Z-axis, along which a greater mass (the tool post and the saddle) needs to be driven. However, the acceleration/deceleration times in the directions of the X-axis and Z-axis are set to the same value Ta.

In step c, the tool T is accelerated in the direction of the X-axis for a pullout operation while the tool T is decelerated in the direction of the X-axis to stop the tool feed. Accordingly, until the tool T is completely disengaged from the work W, the feed in the direction of the Z-axis becomes inconsistent with the regular screw thread pitch, resulting in an incomplete thread portion at the end of the effective thread portion.

In Published Unexamined Patent Application No. 2007-319971, a method is proposed comprising the steps of setting an idle running region outside the effective thread portion and allowing the tool to overrun to the idle running region so as to perform a pullout operation without the tool in contact with the work (see paragraph [0023]).

Problems to Be Solved by the Invention

Not having the regular screw thread pitch, the incomplete thread portion should have as short a length as possible. One approach would be to shorten the incomplete thread portion by augmenting the acceleration/deceleration capabilities of the machine tool in the direction of the X-axis (i.e., the "cut-in" axis) and thus increasing the speed at which the tool T performs a pullout operation. Cutting tapered threads on the work requires biaxial synchronous feed to be performed in the direction of the X-axis and Z-axis. In this type of machining, reduction of the acceleration/deceleration time after interpolation and increase of the acceleration/deceleration requires that the acceleration/deceleration capabilities of the machine tool along both, the X-axis and Z-axis, be enhanced. One problem that has been encountered in the art, however, is that the incomplete thread portion on work cannot be easily shortened as the acceleration/deceleration capabilities in the direction of the X-axis cannot be sufficiently enhanced due to the limitation on the acceleration/deceleration capabilities in the direction of the Z-axis.

According to the method of thread cutting disclosed in the foregoing reference, no incomplete thread portion is created since the pullout operation is carried out outside of the effective thread portion. It should be noted, however, that the method will not accomplish its intended objective if the work is shaped in a way that does not permit idle running regions to be formed outside of the effective thread portion. Furthermore, the condition requiring the tool to overrun increases the time required for the thread cutting cycle.

SUMMARY OF THE INVENTION

In view of the above, one important object of the present invention is to provide a method of thread cutting that can easily shorten the incomplete thread portion on work by augmenting the acceleration/deceleration capabilities of the a machine tool in the direction of the X-axis only.

Means to Solve the Problems

In order to solve the above-identified problem, the invention provides a method of controlling thread cutting that comprises the steps of: performing thread cutting in work held on a main spindle with a tool by transferring the tool in the direction of a Z-axis parallel to an axis of the main spindle in synchronization with rotation of the main spindle, and after the thread cutting, performing a pullout operation in which the tool is retracted in the direction of an X-axis perpendicular to the axis of the main spindle, the tool being accelerated and decelerated under acceleration/deceleration time constant control whereby feed shafts reach a maximum allowable speed in a prescribed acceleration/deceleration time Ta, wherein in the pullout operation, a speed command Ve for causing the acceleration/deceleration in the direction of the X-axis to be greater than acceleration α1 under the acceleration/deceleration time constant control and smaller than allowable acceleration α2 in the direction of the X-axis is issued during time Te when the actual speed of the tool in the direction of the X-axis remains at or below an allowable maximum speed Vmax in the direction of the X-axis and, subsequently, the speed command of the value of zero is issued until acceleration/deceleration time Ta elapses (Ta−Te) under the acceleration/deceleration time constant control so as to control the acceleration/deceleration of the pullout operation.

In one aspect of the method according to the present invention, the speed command Ve for the pullout operation is calculated from the following equation (1) and the command time Te for the pullout operation is calculated from the following equation (2):

$$Ve = (\alpha 2/\alpha 1) \times V\max \quad (1)$$

$$Te = (\alpha 1/\alpha 2) \times Ta \quad (2)$$

Effect of the Invention

The method of cutting threads in work commands a high pullout speed along the X-axis during the pullout operation so as to provide a higher acceleration along the X-axis than the deceleration along the Z-axis, thus quickly disengaging the tool from the work and reducing the length of the incomplete thread portion.

BRIEF DESCRIPTION OF THE ATTACHED DRAWINGS

For a fuller understanding of the nature and objects of the present invention, reference should be made to the following detailed description and the accompanying drawings, in which.

DETAILED DESCRIPTION OF THE PREFERRED EMBODIMENTS

Embodiments of the present invention will be described hereinafter based on FIGS. 5-7. The method according to the present invention is distinguishable over the conventional method used in performance of a pullout operation, i.e., step c of the thread cutting cycle shown in FIG. 2. The method of the embodiment is otherwise identical to the conventional method in that the method of the embodiment employs a numerical control apparatus 1 (see FIG. 1) that performs steps identical to steps a, b, and d as shown in FIG. 2.

Figure 5:
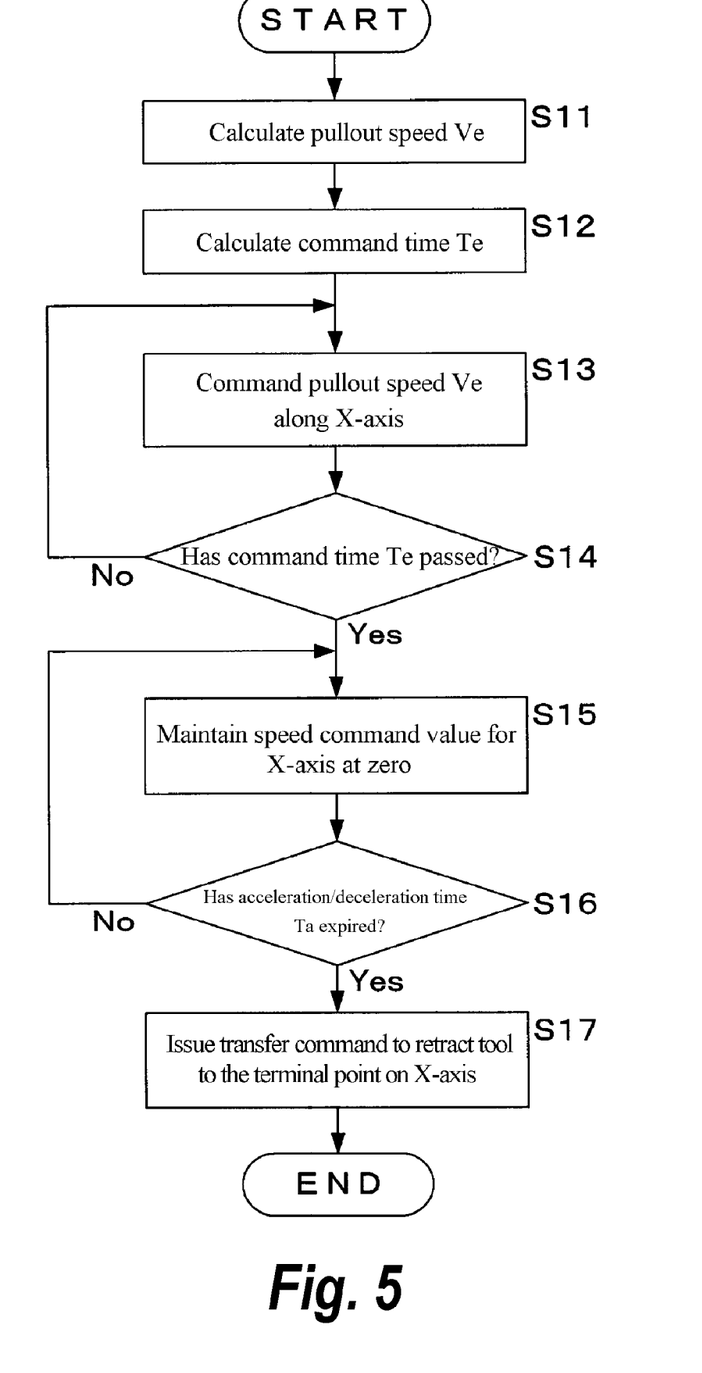
FIG. 5 is a flowchart showing a method of cutting threads on work according to an embodiment of the present invention.

As the program analyzer 2 of the numerical control apparatus 1 reads a thread-cutting command from the machining program, the thread cutting controller 3 calculates from the equation (1) below the pullout speed Ve to be commanded for performing the pullout operation in the direction of the X-axis in step S11 as shown in FIG. 5. In the subsequent step, step S12, the command time Te for the pullout speed Ve is calculated from the equation (2) below.

$$Ve = (\alpha 2/\alpha 1) \times V\max \quad (1)$$

$$Te = (\alpha 1/\alpha 2) \times Ta \quad (2)$$

wherein

α1 represents the allowable acceleration in the direction of the Z-axis;

α2 represents the allowable acceleration in the direction of the X-axis;

Vmax represents the allowable maximum speed in the direction of the X-axis; and

Ta represents the acceleration/deceleration time for the X-axis and Z-axis (the acceleration/deceleration time under acceleration/deceleration time constant control).

Figure 6:
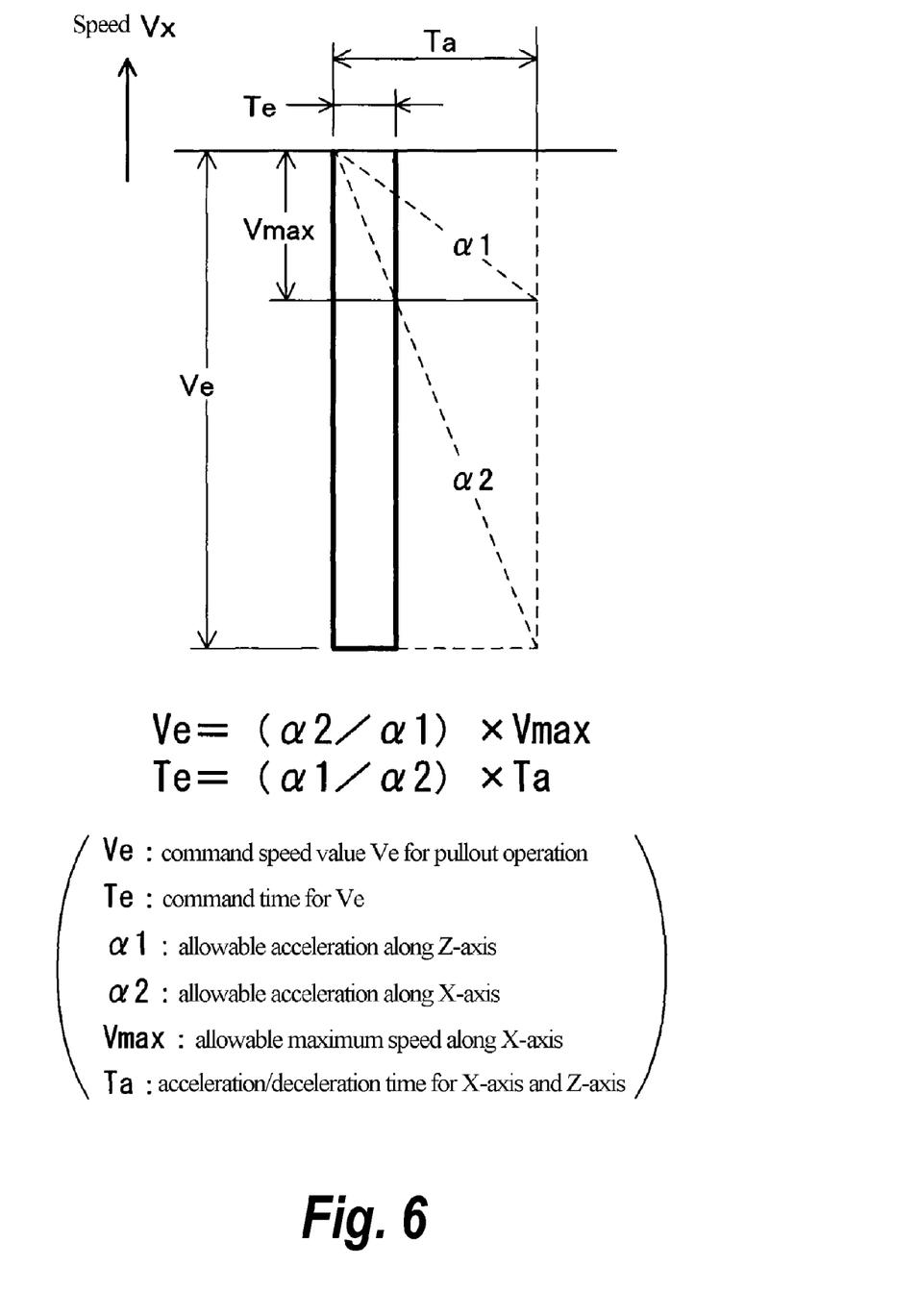
FIG. 6 is a supplemental chart that explains the equations for calculating the pullout speed and the command time shown in FIG. 5.

As shown in FIG. 6, the pullout speed Ve is a command speed that, in the acceleration/deceleration time constant control performed during the predetermined acceleration/deceleration time Ta, causes the actual acceleration in the direction of the X-axis (the interpolated acceleration) to coincide with α2 (the allowable acceleration in the direction of the X-axis). In this embodiment, the pullout speed Ve is set to a value greater than Vmax (the allowable maximum speed in the direction of the X-axis). Accordingly, the command time Te is set as the time interval or duration between the start of Ta, the acceleration/deceleration time, and the time at which the actual speed of the tool in the direction of the X-axis (the interpolated speed) reaches Vmax, the allowable maximum speed in the direction of the X-axis. Upon passage of the command time Te, the speed command value in the direction of the X-axis is maintained at zero from that point to the expiration of the acceleration/deceleration time.

Once the foregoing calculation is completed, the tool T is positioned at the point where thread cutting is to be started (step a in FIG. 2), threads are cut on the work W with the tool T, which moves in the direction of Z-axis (step b), and then a pullout operation is performed to retract the tool T in the direction of the X-axis (step c). In this pullout operation, the thread cutting controller 3 issues a command for the pullout speed Ve to the X-axis acceleration/deceleration controller 11 via the X-axis position controller 9 during the command time Te so as to increase the acceleration in the direction of the X-axis.

Specifically, in step S13 shown in FIG. 5, a command is issued for the pullout speed Ve in the direction of the X-axis and in step S14, passage of the command time Te is monitored to determine whether or not the command time Te has passed. Once the command time Te has elapsed, the speed command value for the direction of the X-axis is maintained at zero in step S15 and it is determined in step S16 whether or not the acceleration/deceleration time Ta has expired. Upon expiration of the acceleration/deceleration time Ta, a transfer command is issued in step S17 to retract the tool T to the terminal point on the X-axis. Subsequently, the tool T is returned to the reference point of the thread cutting cycle (step d of FIG. 2).

Figure 7:
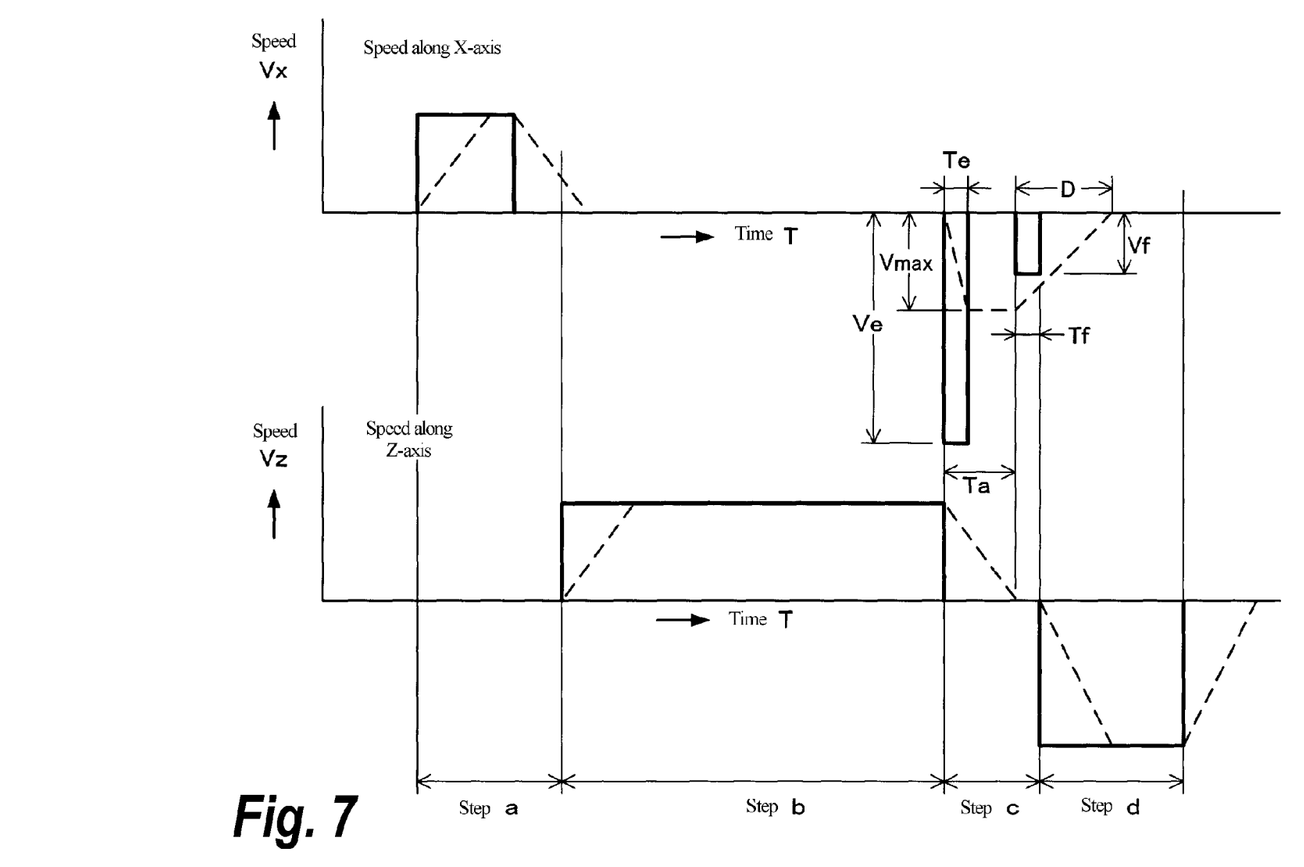
FIG. 7 is a timing diagram showing the changes in the speed of the tool_in the directions of the X-axis and Z-axis according to the method of the present invention.

FIG. 7 is a timing diagram showing the changes in the speed of the tool in the directions of the X-axis and Z-axis according to the foregoing method of the present invention for cutting threads in work, which indicates differences from the conventional method of thread cutting in the pullout operation in the direction of the X-axis carried out in step c (see FIG. 4). In step c, the pullout speed Ve, a value greater than Vmax (the allowable maximum speed of the tool in the direction of the X-axis,) is commanded at the start of the acceleration/deceleration time Ta. Upon passage of the command time Te, the speed command value is maintained at zero for the remainder of the acceleration/deceleration time Ta (Ta minus Te) such that the tool T retracts at the allowable maximum speed Vmax. A transfer command (Vf×Tf) corresponding to the remainder of the distance in the direction of the X-axis is issued to move the tool T to the retract position on the X-axis.

As such, according to the method of thread cutting in this embodiment, a pullout speed Ve in the direction of the X-axis, which is greater than the allowable maximum speed Vmax, is commanded during the time Te, when the actual tool speed does not exceed the allowable maximum speed Vmax. This simple numerical control technique increases the acceleration in the direction of the X-axis to allow the tool T to quickly move away from the work W, thereby reducing the amount of the incomplete thread portion. Moreover, this technique offers the additional advantage of increasing the speed of the pullout operation without causing the tool to run out of control in the direction of the X-axis.

In the foregoing embodiment, the pullout speed command Ve is defined such that the acceleration in the direction of the X-axis coincides with the allowable acceleration $\alpha 2$. It should be noted, however, that alternative approaches are possible. For example, for the pullout speed command Ve, a value may be selected based on the range of acceleration greater than $\alpha 1$, the allowable acceleration in the direction of the Z-axis, and smaller than $\alpha 2$, the allowable acceleration in the direction of the X-axis, so that this pullout speed Ve may be commanded during the time Te when the actual speed does not exceed the allowable maximum speed Vmax. Furthermore, it is possible to practice the present invention by suitably modifying the constitution of the numerical control apparatus or any components thereof and/or the steps included in the method of thread cutting without departing from the spirit and scope of the present invention.

EQUIVALENTS

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

Having described the invention, what is claimed as new and desired to be secured by letters patent is:

1. A method of controlling thread cutting, comprising the steps of, performing thread cutting in work held on a main spindle with a tool by transferring the tool in the direction of a Z-axis parallel to an axis of the main spindle in synchronization with rotation of the main spindle, and after the thread cutting, performing a pullout operation in which the tool is retracted in the direction of an X-axis perpendicular to the axis of the main spindle, the tool being accelerated and decelerated under acceleration/deceleration time constant control whereby feed shafts reach a maximum allowable speed in a prescribed acceleration/deceleration time Ta, wherein in the pullout operation, a speed command Ve for causing an acceleration in the direction of the X-axis to be greater than an accelerational under the acceleration/deceleration time constant control and smaller than an allowable acceleration $\alpha 2$ in the direction of the X-axis is issued during command time Te when an actual speed of the tool in the direction of the X-axis remains at or below an allowable maximum speed Vmax in the direction of the X-axis and, subsequently, a speed command of value zero is issued until the prescribed acceleration/deceleration time Ta elapses under the acceleration/deceleration time constant control so as to control the acceleration in the direction of the X-axis during the pullout operation.

2. A method in accordance with claim 1, wherein the speed command Ve for the pullout operation is calculated from the following equation (1) and the command time Te for the pullout operation is calculated from the following equation (2):

$$Ve = (\alpha 2/\alpha 1) \times Vmax \quad (1)$$

$$Te = (\alpha 2/\alpha 1) \times Ta \quad (2)$$

* * * * *